Figure 1:
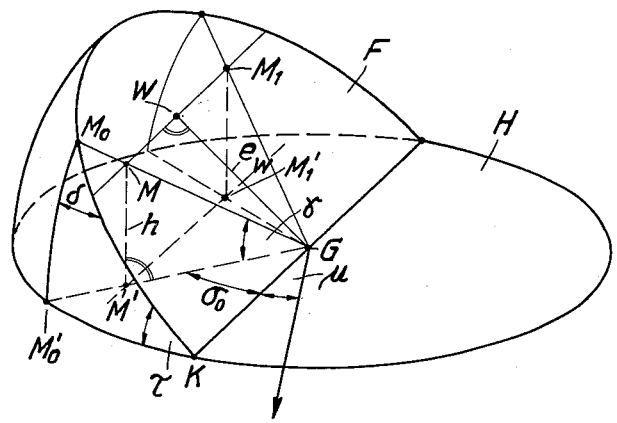

March 13, 1962   A. KUHLENKAMP   3,024,536
ORDNANCE SIGHT FOR MOBILE TARGETS
Filed Aug. 11, 1954   6 Sheets-Sheet 1

Inventor:
ALFRED KUHLENKAMP
by L. S. Saulsbury
ATTORNEY

March 13, 1962 A. KUHLENKAMP 3,024,536
ORDNANCE SIGHT FOR MOBILE TARGETS
Filed Aug. 11, 1954 6 Sheets-Sheet 2

Inventor:
ALFRED KUHLENKAMP
by L. S. Saulsbury
ATTORNEY

March 13, 1962   A. KUHLENKAMP   3,024,536
ORDNANCE SIGHT FOR MOBILE TARGETS
Filed Aug. 11, 1954   6 Sheets-Sheet 3

Inventor:
ALFRED KUHLENKAMP
by L. S. Saulsbury
ATTORNEY

March 13, 1962  A. KUHLENKAMP  3,024,536
ORDNANCE SIGHT FOR MOBILE TARGETS
Filed Aug. 11, 1954  6 Sheets-Sheet 5
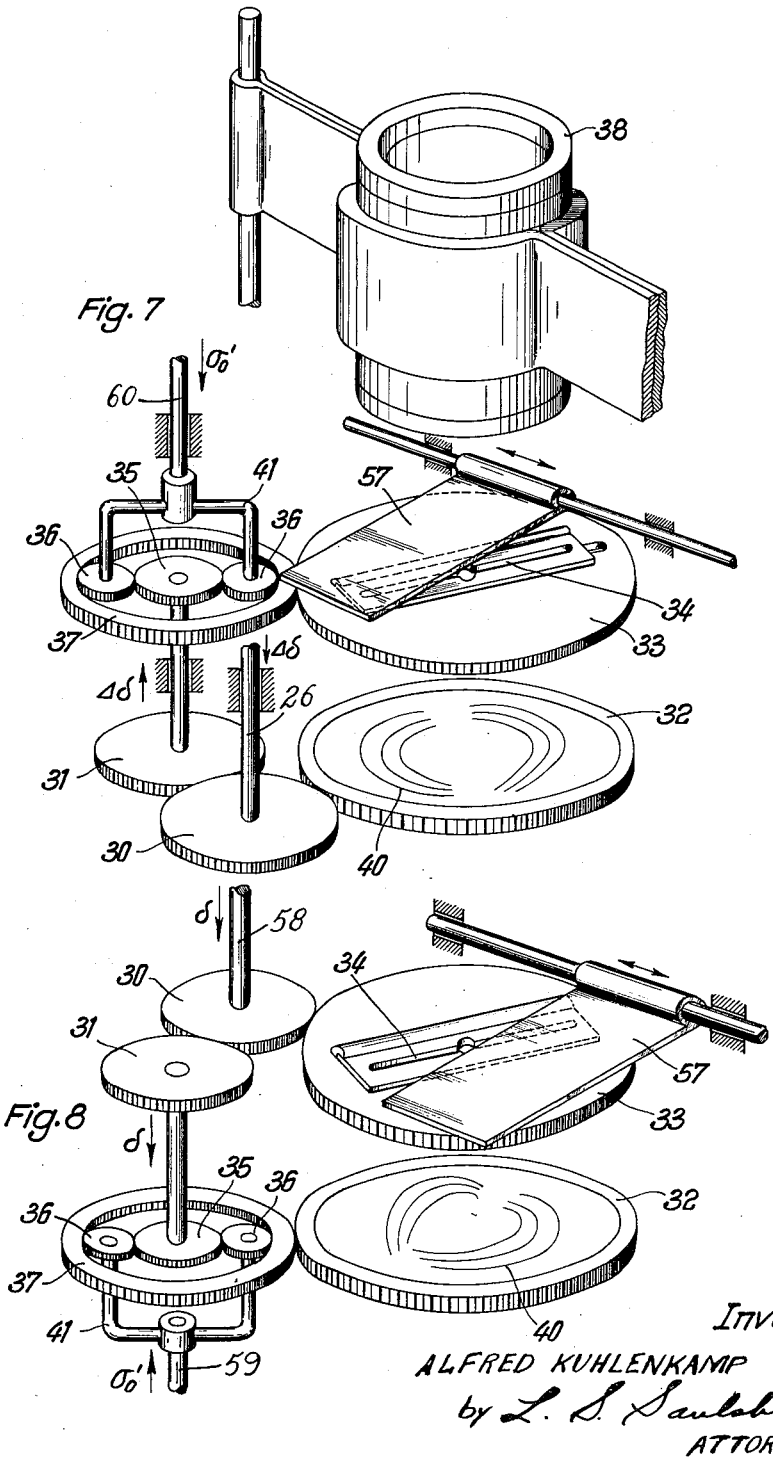
Inventor:
ALFRED KUHLENKAMP
by L. S. Saulsbury
ATTORNEY

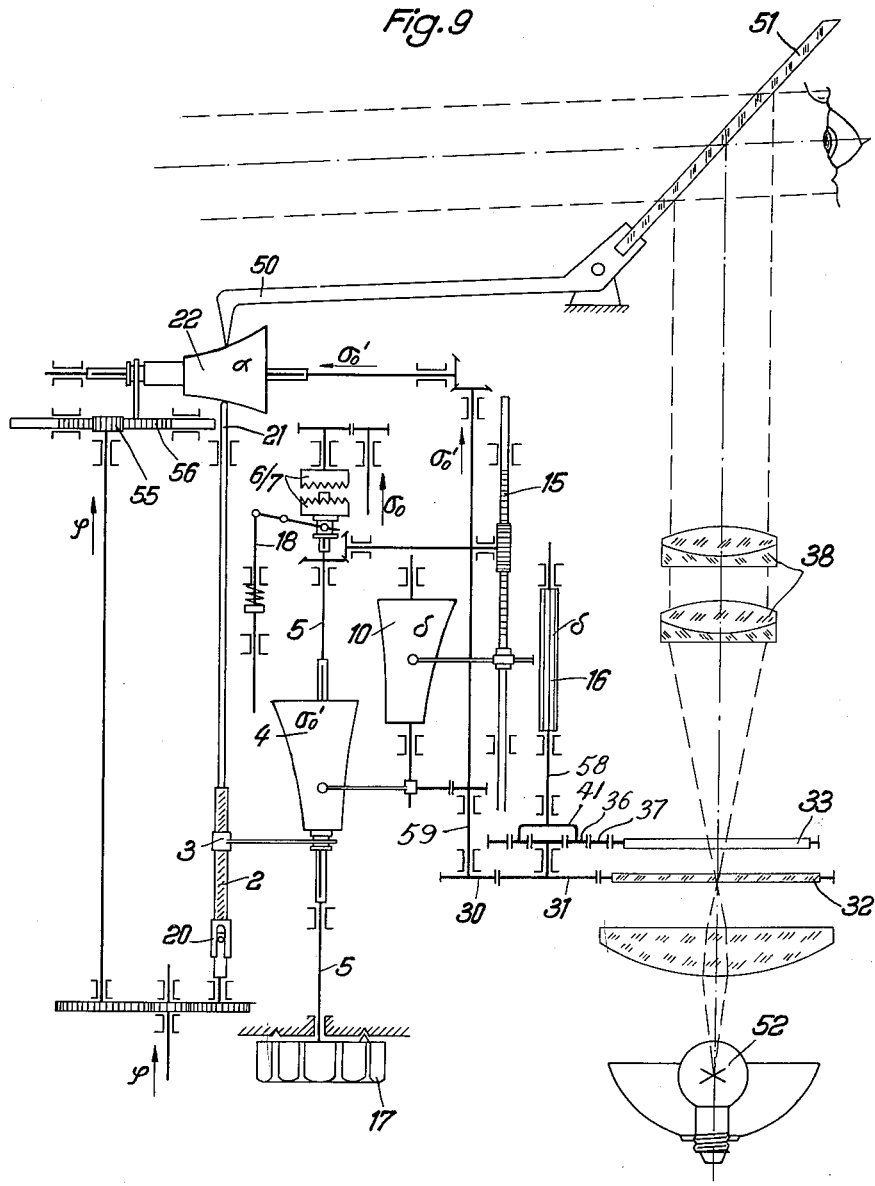

3,024,536
ORDNANCE SIGHT FOR MOBILE TARGETS
Alfred Kuhlenkamp, Braunschweig, Germany, assignor to Mathema Corporation Reg. Trust, Vaduz, Liechtenstein, and Tangier
Filed Aug. 11, 1954, Ser. No. 449,123
8 Claims. (Cl. 33—49)

Aiming devices for anti-aircraft guns are known in which the apparent direction of flight is obtained, and indicated in the field of view of a telescope or other sighting device (reflex sight), with the aid of directional movements imparted to the handwheels of the weapon for elevation and bearing, these devices employing a system wherein the motion of the aircraft is simulated on a sphere and in which aiming points or points of contact with the target, governed by the speed of flight, are indicated automatically on the indicator mark representing the apparent direction of flight, the gunner being required to cause these points to coincide with the image of the aircraft in order to obtain a successful hit. Furthermore, measures have been proposed, whereby, for example, by pre-adjustment of an estimated direction of flight, the calculating process is accelerated by automatic determination of the apparent direction of flight, employing a sphere drive.

On the other hand, the invention relates similarly to an aiming apparatus for weapons to combat mobile targets, in particular, aircraft, in which, by progressive means, a control device of an aiming apparatus is employed to set in a medially occurring initial position of the aircraft relative to the gun through the bearing angle between the aiming line and the trace of the plane of flight in the ground plane which is taken to be, approximately 45°. By means of a computing device governed merely by the continuous tracking of the aircraft, i.e. without any special range-finding operation, aiming-off (lead) values are determined for each point on the aircraft's path and the aiming or contact points are indicated in the field of view of a sighting device, e.g. reflex sight, on the basis of the aiming-off values determined by the computer. The automatic and continuous calculation of the apparent direction of flight is therefore accelerated by basing the calculation on average data.

These average data relate to:

(1) The paths of the aircraft taken in relation to the position of the gun;
(2) The distances between the aircraft and the gun site.

Regarding 1, choice is made between:

(a) Aircraft approaching from left;
(b) Aircraft approaching from right;
(c) Aircraft approaching from front.

Here, an angle of, for example, 45° measured from the trace KG of the plane of flight in the horizontal plane of the gun (see FIG. 1) is taken as the medially occurring and therefore assumed value of the bearing angle at the moment of taking aim.

Regarding 2, this is based on assuming an aircraft flight path which is rectilinear and horizontal and lies centrally within the range of the weapon and which at its nearest point has an assumed distance from the gun, which is called the "changing point range."

The time of flight of the projectile required in the computer for determining the extent of aiming-off values, which is obtained from the product of velocity of the aircraft and time of flight of the projectile, is given for any path of flight of the aircraft in respect of any point of the target, dependent upon the particular range of the target or upon the sighting values of the gun. The aiming-off value is given as an angle or arc in the plane of flight.

A further conception of the aiming process according to the invention consists in that, as a basis for the calculation of the direction of the aiming-off values in the computer, the mathematical relationships for the plane of flight are taken, i.e. the spherical relationships between the sighting values (angle of bearing, angle of elevation) of the weapon and of the apparent direction of flight. It is convenient here to provide in the computer various aircraft velocities, e.g. 100 m./sec., 200 m./sec., 300 m./sec. in the form of a series of curves which give the aiming-off values and, dependent upon the setting of sight data on the weapon, are automatically adjusted and specially indicated on the field of view of the sighting apparatus. The particular (cam profile) curve to be selected is in such case determined by the aircraft speed estimated.

In the drawings, embodiments are illustrated of devices suitable for carrying out the new aiming method.

Figure 2:
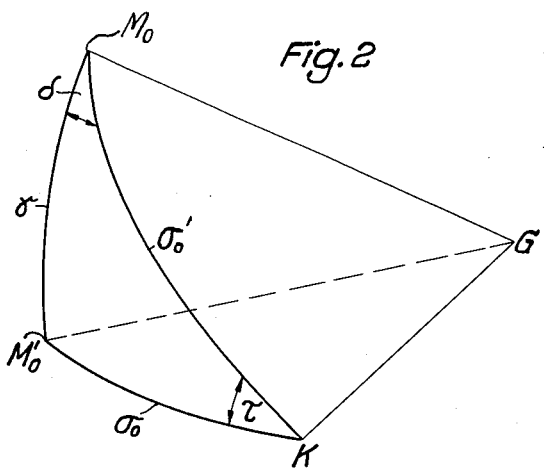

FIGS. 1 and 2 offer an explanation of the manner of working of the following figures and provide a representation of the spherical relationships from which the mathematical formulae employed can be understood.

Figure 3:
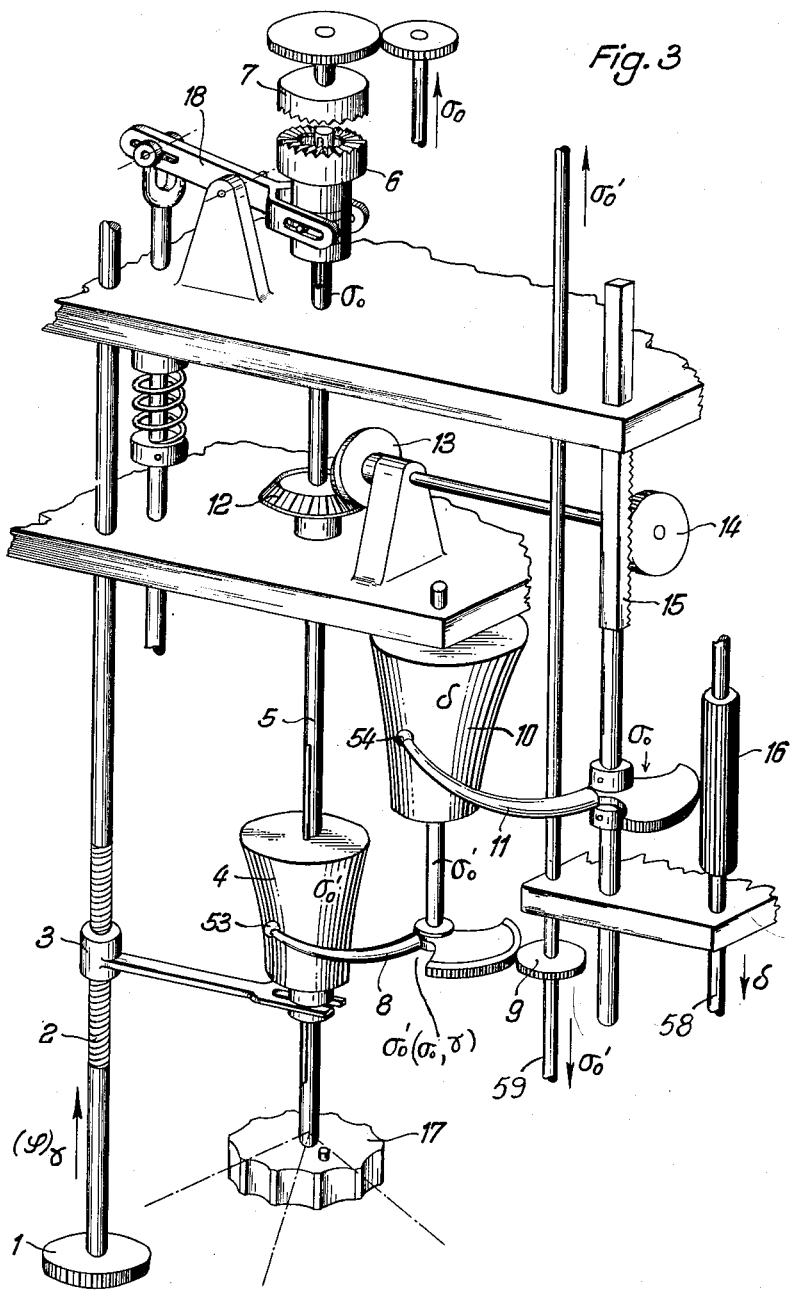

FIGS. 3, 7 and 8 illustrate in perspective the essential parts of the aiming apparatus.

Figure 4:
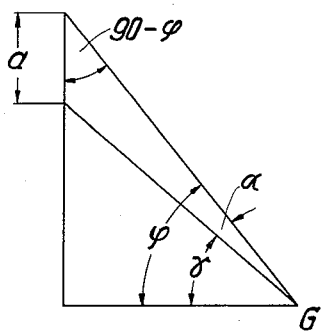

FIG. 4 gives the accepted geometrical data in a simple approximation method for determining the effective angle of sight, as a basis for which the path of descent of the projectile is employed in conjunction with the range.

Figure 5:
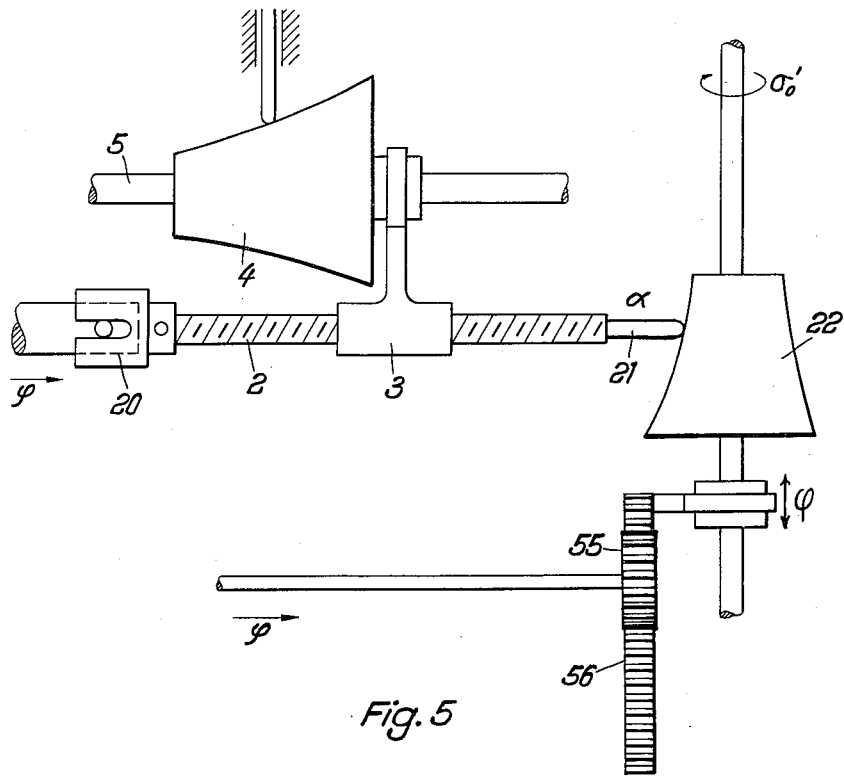
Figure 6:
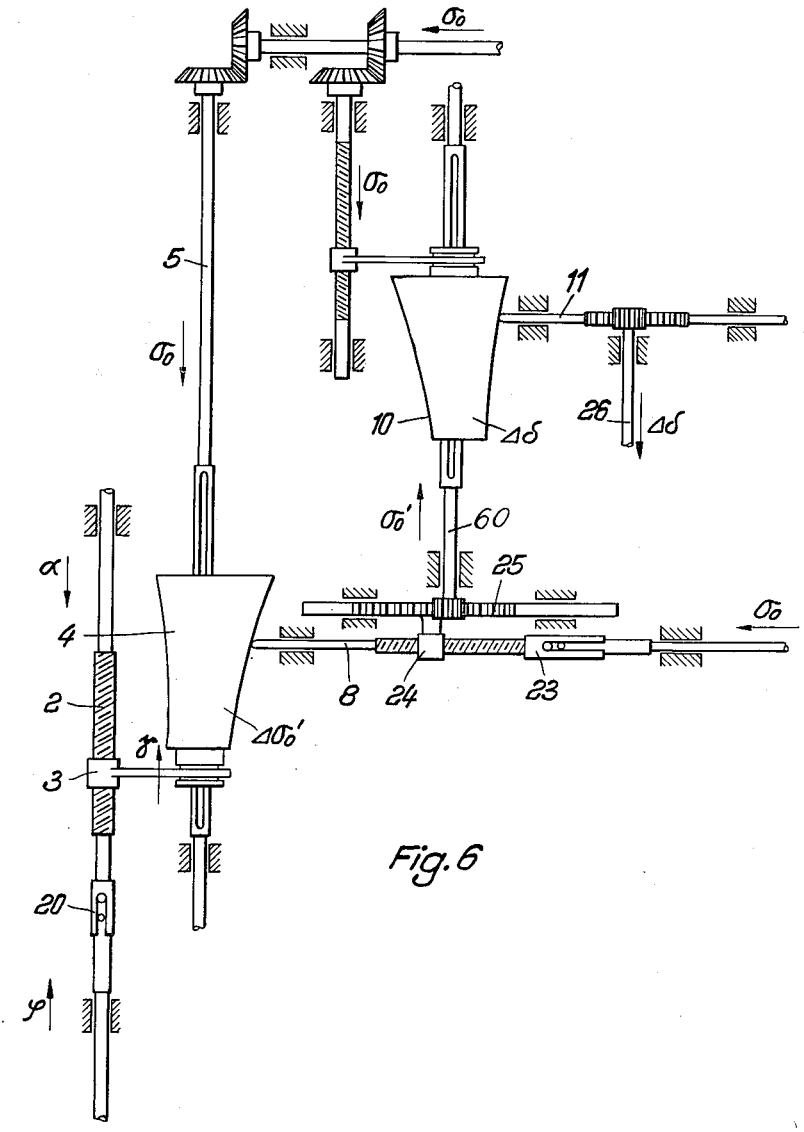

FIGS. 5 and 6 show in side elevation a further embodiment of the aiming apparatus, and FIG. 9 illustrates the entire assembly of essential parts of the aiming device diagrammatically in side elevation.

In FIG. 1 the plane F is the plane of flight inclined to the horizontal plane H by the angle $\tau$, and in which the aircraft moves. On the path of flight lie the points $MWM_1$. The projection in the horizontal plane is shown by $M'$ and $M_1'$. A medial path of flight is chosen, in which the change-point ranges GW lie within the medium gun range. In finding the target, it is assumed that the bearing angle $\sigma_0$ has a value of e.g. 45° for "approach from left to right" or of e.g. 135° for "approach from right to left."

The point under observation M at an altitude $MM'=h$ is determined by the angle of elevation $MGM'=\gamma$ which appears as an arc $M_0M_0'$, on the surface of the sphere with radius=1 imagined as surrounding the observer, and which gives the bearing angle $KGM_0'=\sigma_0$. In general the zero datum (represented in FIG. 1 by the arrow from G) of the bearing angle does not coincide with the trace line KG of the plane of flight. If the angle between the zero datum and trace line is called $\mu$, the bearing angle $\sigma$ in relation to the zero datum has the value;

$$\sigma = \sigma_0 + \mu$$

In the right-angle spherical triangle $KM_0M_0'$ (FIG. 2) we find the arc $M_0M_0'$=angle of elevation $\gamma$, the arc $KM_0'$=bearing angle $\sigma_0$, the angle of flight $KM_0M_0'=\delta$ which lies in the sighting apparatus as an angle between the radially directed flight direction line and the vertical, i.e. the meridian, and the arc $KM_0$=bearing angle $\sigma_0'$ in the plane of flight.

Involving the above, the following are true:

$$\cos \sigma_0' = \cos \sigma_0 \cdot \cos \gamma \qquad (1)$$
$$\sin \sigma_0 = \sin \sigma_0' \cdot \sin \gamma \qquad (2)$$

For each value of the bearing angle $KM_0'=\sigma_0$ and of the angle of elevation $M_0M_0'=\gamma$, the corresponding bearing angle $\sigma_0'$ in the plane of flight is calculated according to Equation 1, and the apparent angle of flight is calculated according to Equation 2. The bearing angle $\sigma_0'$ and the angle $\delta$ are employed at the same time to determine the aiming-off angle which appears on the flight direction line as a stroke on the screen of the sighting apparatus.

On the basis of the assumed medial path of flight of the aircraft, to each value of the bearing angle $\sigma_0'$ belongs a particular aircraft point M, whereby the range GM dependent upon $\sigma_0'$ is known for the entire path of the target.

With the time of flight of the projectile for each point M also ascertained from the range table, aiming-off values in the plane of flight F may accordingly be calculated for certain selected aircraft speeds, these aiming-off values being indicated as points of burst or of contact on the flight direction line on the screen of the sighting device.

FIG. 3 shows a method of execution of a geared mechanism required for solving the problems stated above. It is firstly assumed that the effective angle of sight (superelevation) which is concerned with the path of the projectile under the influence of gravitation, may be neglected (high initial velocity of the projectile). The gear 1 engages with the elevation mechanism of the weapon and thus rotates in proportion to the angle $\gamma$. It drives the worm screw 2, along which a nut 3 is displaced which carries with it the curved body 4. The curved body 4 is guided on the shaft 5 by a slot and key arrangement. The shaft 5 engages with the azimuth mechanism of the gun through a clutch 6, 7 which when closed causes the shaft 5 to rotate in proportion to the bearing angle $\sigma_0$. The curved body 4 is so constructed that the finger 8 pressing against it by spring tension follows paths which are proportional to the bearing angle $\sigma_0'$ in the plane of flight. By means of the finger 8, firstly, the angle $\sigma_0'$ is conveyed to the sighting device through a pinion 9 to provide the aiming-off value (see FIG. 7), and, secondly, the curved body 10 is rotated. The finger 11 in contact with the curved body 10 is displaced by connection to the shaft 5, employing the bevel gears 12, 13, a pinion 14, and rack 15, in proportion to the angle $\sigma_0'$. The finger 11 rotates in proportion to the angle $\delta$ which is also conveyed to the sighting device through the broad faced pinion 16 (see FIG. 8).

The point 53 or 54 of the finger 8 or 11 is of spherical formation at its point of contact with the curved body 4 or 10 and the displacement of the centre point of the sphere is proportional to the function value $\sigma_0'$ or $\delta$.

The finger 8 rotates about an axis—about which curved body 10 also rotates—in a manner always proportional to the angle $\sigma_0'$. This angle $\sigma_0'$ is derived from the elevation angle $\gamma$ and from the bearing angle $\sigma_0$. For each value of $\sigma_0'$ (on the curved body 4) there exists the corresponding value of the angle $\gamma$ and the corresponding value of the angle $\sigma_0$. The required cosine relationship between the angles $\gamma$ and $\sigma_0$ is incorporated into the mechanical form of the curved body 4.

The sine relationship of the values of the angles given in Equation 2 above is incorporated into the form of the curved body 10. The rotation of curved body 10 is proportional to angle $\sigma_0'$, whilst the finger 11 is displaced longitudinally of the curved body 10 proportionally to $\sigma_0$. For a particular value of $\sigma'$ and a corresponding value of $\sigma_0$ the angular travel of the finger 11 (as in Equation 2) is in accordance with the value of the angle $\delta$.

When target observation begins, i.e. when the apparatus is first laid on the target, the angle $\sigma_0$ is unknown since the angle $\mu$ between the zero datum and the trace line is unknown (FIG. 3).

If the sighting device is intended to operate without a measured range, a fixed initial value of $\sigma_0$ is selected e.g. 45°. The knob 17 is placed, for example, in the position "target approaching from left," so that the curved body 4 adjusts to the angle $\sigma_0=45°$ whilst by setting the knob 17 at "target approaching from right" the curved body 4 assumes the initial position of 135°. In the position $\sigma_0=45°$ or $\sigma_0=135°$ the clutch 6, 7 is then engaged by means of a spring-tensioned lever 18 and the curved body 4 is rotated in proportion to the bearing angle $\sigma_0$ provided continuously from the azimuth mechanism of the gun. The mechanism then proceeds automatically. After the aircraft has passed, the knob 17 is then returned to the rest position, the curved body 4 assuming the position cosine $\sigma_0=0$ and the clutch disengaged. This position is also the operational position of the sighting device in the case where the target is proceeding directly towards the gun, since under these conditions the bearing angle does not alter at all during the entire path of flight.

The angle of elevation on the elevating mechanism of the gun differs from the angle of elevation $\gamma$ (see FIG. 1) in that it is increased by the effective angle of sight (superelevation) $\alpha$ which is conditioned by the path of the projectile under the influence of gravitation. The sum $\gamma+\alpha$ is referred to as barrel elevation or quadrant elevation $\varphi$. In the computing device in FIG. 3, the "geometric" angle of elevation $\gamma$ is required without the "ballistic" elevation angle $\alpha$. If the error occasioned by neglecting the angle $\alpha$ is not permissible, the arrangement may be supplemented in the following manner. The effective angle of sight alters according to the range and to the angle of elevation $\gamma$. Since a medial path of flight is assumed in the plane of flight, the assumed range is known for any point on the path of flight of the aircraft. It is given by the bearing angle $\sigma_0'$. Since the plane of flight in which the medial path of flight occurs, may be inclined through any desired angle to the horizontal plane, the angle of elevation $\gamma$ is still the decisive factor in determining the effective angle of sight. A simple known approximation method of determining the effective angle of sight consists in that the path of descent of the projectile is employed in conjunction with the range as a basis (FIG. 4). If this amount of descent $a$ is known from the range table of the gun, the effective angle of sight $\alpha$ may be calculated from the mathematical data given in FIG. 4.

An embodiment of the geared computing mechanism is shown in FIG. 5. This geared computing mechanism illustrated in FIG. 5 may be utilised to replace the elements indicated at 1 to 3 in FIG. 3 when the effective angle of sight $\alpha$ is not negligible. The curved body 4 (in conformity with FIG. 3) is no longer displaced in proportion to the angle $\varphi$ resulting from the elevation setting motion but in proportion to the different $\varphi-\alpha$. For this purpose the spindle 2, which is rotated in proportion to the angle $\varphi$ given by the elevating gear, is mounted in such a manner as to be capable of longitudinal displacement by means of the pin and slot type coupling 20. The spindle is further rigidly connected to a finger 21 in contact with the curved body 22. This body 22 is rotated in proportion to the bearing angle $\sigma_0'$ and is displaced in proportion to the quadrant elevation $\varphi$. For this purpose it is connected on the one hand in slidable but nonrotatable relation to the shaft 59 of the pinion 9 (FIG. 3), and on the other for translational drive by rack 56 and gear 55 connected to the shaft coming from the elevating gear. The spindle 2 displaces the nut 3 located upon it so that the nut 3 and thereby the curved body 4 are moved proportionally to the difference $\varphi-\alpha$, i.e. proportionally to the elevation angle $\gamma$. The surface of the curved body 22 is so formed that the path of the finger 21 at every point of contact for each range value corresponding to bearing angle $\sigma_0'$ in the plane of flight and of the quadrant elevation $\varphi$, is proportional to the effective angles of sight obtainable from the range table.

In FIG. 3 at the left hand bottom portion the barrel elevation of the aiming weapon (angle $\varphi$) is set on to gear 1. This barrel elevation differs from the geometrical elevation angle $\gamma$ by the ballistic correction angle $\alpha$. In modern aiming of weapons it is known that due to the high initial velocity of the projectile, the ballistic correction angle $\alpha$ is negligibly small; thereby it follows that $\varphi=\gamma$ can be assumed for practical cases. FIG. 5 illustrates, and the preceding paragraph describes, the exceptional case in which the angle $\gamma$ cannot be assumed to be equal to the angle $\varphi$, and so the resultant gun-carriage barrel elevation is to be set mechanically in correspondence with the correction angle together with the elevation angle $\gamma$.

In order to give the curved bodies a simpler form and to reduce the dimensions thereof, it is, moreover, advisable to compose the desired function value e.g. $\sigma_0',\delta$ as a sum expression from a basic value and a correction value. Thus, the angle $\sigma_0'$ may, for example, be composed from the angle $\sigma_0$, and the correction value $\Delta\sigma_0'$. Likewise, the angle $\delta$ may be composed from the angle $\sigma_0$ or $\sigma_0'$ and the correction value $\Delta\delta$. The advantage thus obtained is that the quantity required from the curved body is smaller.

The construction of a geared mechanism to solve this problem is similar to that illustrated in FIG. 5. For example, the following solution may be chosen (FIG. 6). The curved body 4 is so formed that it gives the difference $\Delta\sigma_0'$ between $\sigma_0$ and $\sigma_0'$ as the displacement of the finger 8, which effects for example, a sliding movement, if said body 4 is displaced in proportion to the angle $\gamma$ and is rotated in proportion to the angle $\sigma_0$. To the path of the finger 8, the value $\sigma_0$ is added by the sliding coupling 23, whereby the nut 24, and consequently the rack 25, are displaced in proportion to the sum $\sigma_0+\Delta\sigma_0'$. This quantity which is equal to the angle $\sigma_0'$ is employed (as explained in FIG. 3) to rotate the aiming-off disc in the sighting apparatus and also the curved body 10. This body 10 is further displaced in proportion to the angle $\sigma_0$ and gives as path of the finger 11 the quantity $\Delta\delta$, which, together with $\sigma_0'$ gives the angle of flight $\delta$. The quantity $\Delta\delta$ is given by the shaft 26 in the sighting apparatus (FIG. 7).

The bearing angle $\sigma_0'$ and angle of flight $\delta$ serve to indicate the aiming or contact points in the sighting device. Where the sighting apparatus is of the reflex type the following arrangement, for example, may be used (FIG. 7):

(a) When the curved body 10 gives as at shaft 26 the correction value $\Delta\delta$ of the angle of flight $\delta$, the gear 30, and with it the intermediate gear 31 and inner gear 35 of the gear differential 36, 37, rotates in proportion to the angle $\Delta\delta$. Thereby the disc 40 with the aiming-off curves and—provided that the U-piece 41 with pinions 36 is stationary—also the disc 33 with the radial slot 34, are rotated in proportion to $\Delta\delta$. Since the flight angle $\delta$ is in this case composed of the sum $\Delta\delta+\sigma_0'$ the U-piece 41 of the curved body 4 is rotated in proportion to the bearing angle $\sigma_0'$, so that the desired sum value is given as the rotary angle of the disc 33. The mask plate 57 is so displaced (not illustrated) by manipulation of the knob 17 (FIG. 3) that, on course of the target from left to right, one half of the radial line 34 is obscured, and, on target course from right to left, the other half is obscured.

(b) When the curved body 10 gives the total value $\delta$ of the flight angle, the geared differential 36, 37 is located adjacent the disc 32 with aiming-off curves 40 (FIG. 8). In this case the gear 33 is rotated, by connecting its drive gear 30 to shaft 53 (FIG. 3), in proportion to the flight angle $\delta$ and the disc 32 with the aiming-off curves 40 is rotated in proportion to the difference $\sigma_0'-\delta$. The bearing angle $\sigma_0'$ is introduced through the U-piece 41 by connecting it to shaft 59 (FIG. 3), and the angle $\delta$ is introduced through gears 31 and 35 driven by gear 30.

In the embodiment shown in FIG. 9, wherein the reflex sight is illustrated, gear 30 may be connected to be driven by shaft 59 so as to rotate in proportion to the bearing angle $\sigma_0'$. The rotation is communicated through an intermediate gear 31 to a transparent glass disc 32, on which the aiming-off curves 40 for various speeds of flight are represented. The aiming-off angle at any particular speed has been assumed in the embodiment shown in FIG. 9 to be a function simply of the bearing angle. Over this disc 32 with aiming-off curves 40 is located as in the preceding embodiment a second opaque disc 33 with radial slot 34, which disc is given one component of its rotation in proportion to the bearing angle $\sigma_0'$ by the shaft of the gear 31 through the geared differential 35, 36, 37, whereby the disc 33 rotates with the disc 32 on setting of the angle $\sigma_0'$.

It is correct that in FIGS. 7 and 8 the curve disc 32 with the aim-off curves 40 is rotated in relation to the difference between the bearing angle in the flight plane $\sigma_0'$ and the flight angle $\delta$. The aim-off curves 40 on the curve disc 32 are however, nevertheless, calculated and recorded in accordance with the theory in relation to the bearing angle in the flight plane $\sigma_0'$.

In FIG. 8 the curve disc 32 is rotated in relation to the azimuth angle $\sigma_0'$ by way of the shaft 59. The disc 33 lying above the curve disc 32 and which carries the line of direction of flight 34 is rotated by the pinion 30 proportional to the angle $\delta$ by way of the shaft 58. The position of the direction of flight line 34 on the disc 33 in relation to the position of the curve disc 32 with aim-off curves 40 gives the point of intersection which in each case according to value and direction gives the correct aim-off angle. Should this aim-off angle remain unaltered in value, but due to another angle of flight $\delta$, change its direction, the disc 33 with flight direction line 34 is rotated by way of the shaft 58 and wheel 30. The curve disc 32 with aim-off curves 40 must however be rotated in the same degree in order to prevent any displacement of the flight direction line 34 relative to the aim-off curves 40. For this purpose the angle $\delta$ passing to the flight-direction disc 33 by way of pinion 30 is also transmitted to the curve disc 32 with aim-off curves 40 by way of pinion 31 and differential 37, 36. Thus not only the angle $\delta$ but also the angle $\sigma_0'$ is caused to influence the disc 32 with aim-off curves 40.

Furthermore, the disc 33 receives through the differential 36 and 37 the other component of its rotation by the U-piece 41 rotating in proportion to the flight angle $\delta$ whereby the radial slot 34 assumes at all times the position corresponding to the sum of the angles $\delta$ and $\sigma_0'$.

Through the optical system 38 the radial line of the slot 34 is indicated in the field of view of the sight as a luminous line interrupted by the aiming-off curves 40 (FIG. 9). The interruptions caused by the aiming-off curves 40 give the contact points dependent upon the selected speed of flight.

In the embodiment shown in FIG. 9 the rotation produced by the laying motion of the gun and proportional to the quadrant elevation $\varphi$ is employed to displace the curved bodies 4 and 22. The body 22 is so constructed that it gives the function value not only during upward but also during downward displacement. The horizontal lever 50 is connected to the reflex screen 51 and inclines the screen so that the aiming line with the direction in which the gun barrel points, includes the effective angle of sight $\alpha$ the aiming line passing through the observer's eye being downwardly inclined. Otherwise the references all coincide with those indicated in FIGS. 3, 5 and 7.

In addition, however, the light source 52 of the reflex sight is shown in FIG. 9. By means of this light the flight direction line 34 with aiming points is projected on to the reflex screen 51. By aiming points is meant the points in the field of sight that the operator is required to bring into register with the target.

The Equations 1 and 2 form the basis of the geared computing mechanism illustrated by way of example in FIGS. 3 to 8 and give the relation between the angle values $\sigma_0$, $\sigma_0'$, $\gamma$, $\delta$. In the right-angle spherical triangle $KM_0M_0'$ (FIG. 2) a further series of known mathematical relationships is shown. From this triangle equations other than those forming the basis of the embodiments described may be selected. For example, the angle of flight δ may be calculated from the equation $$\tan \delta = \tan \sigma / \sin \gamma$$

I claim:
1. Apparatus for aiming weapons intended to combat mobile aircraft targets comprising a control knob having positions determined by the location of the aircraft relative to the gun position, i.e. "aircraft approaching from the right," "aircraft approaching from the left" or "aircraft approaching from the front," a computing cam element connected to said knob, means for adjusting said cam element by the elevation gear of the weapon, a manually operated coupling adapted to connect the azimuth mechanism of the weapon to the computer cam element after the target is picked up by the sighting apparatus, whereby the computer element continues to be driven governed by the azimuth mechanism, a follower positioned by said cam element in proportion to the bearing angle in the plane of flight, a second computing cam element rotatable by said follower, a second follower co-operating with said second cam element, means displacing said second cam follower along said second cam element in proportion to the bearing angle in the horizontal plane through said coupling, and a sighting apparatus having a path of light and including a disc lying in the path of light, said disc being provided with a radially disposed slot and being rotatable by said second follower, and a transparent disc lying in said path of light and provided with a series of curves indicating aiming-off values.

2. Apparatus in accordance with claim 1, in which each computing element consists of a cam body, and each follower consists of a finger, each cam body being rotatable and axially displaceable relative to its follower.

3. Apparatus in accordance with claim 2, in which the surface of the curved body constituting first computing element is so constructed that its corresponding finger, in all positions relative to the curved body, effects a motion, which, governed by the angle of elevation and bearing angle in the horizontal plane, is proportional to the bearing angle in the plane of flight.

4. Apparatus in accordance with claim 3, in which the surface of the curved body constituting the second computing element is so constructed that its corresponding finger, in all positions relative to the curved body, effects a motion, which, governed by the bearing angles is proportional to the apparent angle of flight.

5. Apparatus in accordance with claim 4, in which the head of each finger is of spherical formation at its point of contact with the curved body, and in which the displacements of the center points of the respective spherical formations are proportional one to the value of the bearing angle in the plane of flight and the other to the apparent angle of flight.

6. Apparatus in accordance with claim 5, further comprising a third computing cam element in the form of a curved body, means for displacing said third cam element longitudinally in proportion to motion communicated by the weapon elevation mechanism, said last named means including a rack and pinion, means for rotating said third cam element in proportion to the motion imparted by the finger of the first computing cam element, a spindle displaceable by said third cam element and a spindle nut in co-operation with said spindle in such a manner that the nut is adjusted in proportion to the difference between the angle of the weapon barrel to the horizontal and the effective angle of sight.

7. Apparatus in accordance with claim 6, the surface of the curved body forming said third computing element being so constructed that the movement of the spindle in engagement therewith, at any point of contact for any range value corresponding to the bearing angle in the plane of flight and of quadrant elevation, is proportional to the effective angles of sight obtainable from a range table.

8. Apparatus for aiming weapons intended to combat moving targets such as aircraft comprising a sighting device, two parallel discs, means rotatably supporting the discs one in front of the other in the field of view of said sighting device, one disc being transparent and provided with a series of curves indicating aiming-off values for various target velocities, the aiming-off values for each curve being derived for an assumed horizontal rectilinear flight path of the target and an assumed least distance of the path from the weapon, the second disc being opaque and having a radially disposed slot providing a radial line in the field of view of the sighting device, and computer mechanisms the input drives of which are adapted to be operated in dependence only upon the bearing and elevational angles of the weapon to rotate the discs differentially through angles dependent upon the bearing angle in the plane of flight and to the apparent angle of flight so that the intersection of the radial line produced by the opaque disc and a selected curve on the transparent disc indicates the aiming point to be maintained on the sight representation of the target in order to aim the weapon with the correct aiming-off value to hit the target.

References Cited in the file of this patent
UNITED STATES PATENTS

| | | |
|---|---|---|
| 2,372,613 | Svoboda | Mar. 27, 1945 |
| 2,407,191 | Tear et al. | Sept. 3, 1946 |
| 2,539,501 | Weiss | Jan. 30, 1951 |
| 2,577,785 | Lyon | Dec. 11, 1951 |
| 2,579,510 | Nagy et al. | Dec. 25, 1951 |
| 2,590,875 | Lancor | Apr. 1, 1952 |
| 2,609,606 | Draper et al. | Sept. 9, 1952 |
| 2,658,277 | Davis et al. | Nov. 10, 1953 |
| 2,693,031 | Clark et al. | Nov. 2, 1954 |

FOREIGN PATENTS

| | | |
|---|---|---|
| 309,236 | Italy | Nov. 2, 1954 |